US011428786B2

(12) United States Patent
Munro

(10) Patent No.: US 11,428,786 B2
(45) Date of Patent: Aug. 30, 2022

(54) DUAL WAVEFORMS FOR THREE-DIMENSIONAL IMAGING SYSTEMS AND METHODS THEREOF

(71) Applicant: Munro Design & Technologies, LLC, Ontario, NY (US)

(72) Inventor: James F. Munro, Ontario, NY (US)

(73) Assignee: MUNRO DESIGN & TECHNOLOGIES, LLC, Ontario, NY (US)

( * ) Notice: Subject to any disclaimer, the term of this patent is extended or adjusted under 35 U.S.C. 154(b) by 921 days.

(21) Appl. No.: 16/208,220

(22) Filed: Dec. 3, 2018

(65) Prior Publication Data

US 2019/0170878 A1 Jun. 6, 2019

Related U.S. Application Data

(60) Provisional application No. 62/667,442, filed on May 5, 2018, provisional application No. 62/643,014, filed (Continued)

(51) Int. Cl.

| | |
|---|---|
| ***G01S 7/481*** | (2006.01) |
| ***G01S 17/36*** | (2006.01) |
| ***H04N 5/238*** | (2006.01) |
| ***G01S 7/4911*** | (2020.01) |
| ***G01S 7/497*** | (2006.01) |
| ***G01S 7/484*** | (2006.01) |

(Continued)

(52) U.S. Cl.

CPC ............ *G01S 7/4815* (2013.01); *G01S 7/484* (2013.01); *G01S 7/4816* (2013.01); *G01S 7/497* (2013.01); *G01S 7/4911* (2013.01); *G01S 17/18* (2020.01); *G01S 17/34* (2020.01); *G01S 17/36* (2013.01); *G01S 17/894* (2020.01); *G06T 1/20* (2013.01); *G06T 7/521* (2017.01); *G06T 7/55* (2017.01); *G06T 7/586* (2017.01); *G06T 7/593* (2017.01); *G06T 7/60* (2013.01); *H04N 5/238* (2013.01); *H04N 5/2352* (2013.01); *H04N 13/156* (2018.05); *H04N 13/167* (2018.05); *H04N 13/254* (2018.05); *H04N 13/296* (2018.05); *G01S 13/342* (2013.01); *G06T 2200/04* (2013.01)

(58) Field of Classification Search

None

See application file for complete search history.

(56) References Cited

U.S. PATENT DOCUMENTS

| | | | |
|---|---|---|---|
| 4,935,616 | A | 6/1990 | Scott |
| 6,288,776 | B1 | 9/2001 | Cahill et al. |

(Continued)

OTHER PUBLICATIONS

International Search Report and Written Opinion for PCT Application No. PCT/US18/63665, dated Feb. 19, 2019.

(Continued)

*Primary Examiner* — James M Hannett

(74) *Attorney, Agent, or Firm* — Troutman Pepper Hamilton Sanders LLP (Rochester)

(57) ABSTRACT

A three-dimensional imaging system includes an image intensification subsystem and an illumination subsystem that are both capable of operating with sinusoidal or pulsed waveforms in accordance with phase-measuring or flash modes of operation, respectfully, of the three-dimensional imaging system.

18 Claims, 5 Drawing Sheets

Related U.S. Application Data on Mar. 14, 2018, provisional application No. 62/593,970, filed on Dec. 3, 2017.

(51) Int. Cl.

| | |
|---|---|
| ***G01S 17/18*** | (2020.01) |
| ***G01S 17/34*** | (2020.01) |
| ***G01S 17/894*** | (2020.01) |
| ***G06T 7/521*** | (2017.01) |
| ***G06T 7/55*** | (2017.01) |
| ***G06T 7/593*** | (2017.01) |
| ***G06T 7/60*** | (2017.01) |
| ***G06T 7/586*** | (2017.01) |
| ***H04N 13/254*** | (2018.01) |
| ***H04N 13/296*** | (2018.01) |
| ***H04N 5/235*** | (2006.01) |
| ***H04N 13/167*** | (2018.01) |
| ***H04N 13/156*** | (2018.01) |
| ***G06T 1/20*** | (2006.01) |
| *G01S 13/34* | (2006.01) |

(56) References Cited

U.S. PATENT DOCUMENTS

| | | | | |
|---|---|---|---|---|
| 6,584,283 | B2 | 6/2003 | Gabello et al. | |
| 6,707,054 | B2 | 3/2004 | Ray | |
| 6,856,382 | B2 | 2/2005 | Cahill et al. | |
| 6,925,195 | B2 | 8/2005 | Cahill et al. | |
| 6,950,135 | B2 | 9/2005 | Mckee et al. | |
| 8,254,665 | B2 | 8/2012 | Munro | |
| 8,976,433 | B2 * | 3/2015 | Masumura | G02B 21/0052 359/10 |
| 2009/0097251 | A1 * | 4/2009 | Lapchuk | G02B 26/0808 362/253 |
| 2014/0055565 | A1 | 2/2014 | You et al. | |
| 2014/0300701 | A1 | 10/2014 | Park et al. | |
| 2015/0296201 | A1 | 10/2015 | Banks | |
| 2016/0004920 | A1 | 1/2016 | Armstrong-Crews et al. | |
| 2016/0142701 | A1 | 3/2016 | Jeon et al. | |
| 2018/0247397 | A1 * | 8/2018 | Keahey | A61B 1/0646 |

OTHER PUBLICATIONS

"Heterodyne", Nov. 13, 2018, 4 pages, Wikipedia, Retrieved from the Internet: <https://en.wikipedia.org/wiki/Heterodyne>.

"Frequency Synthesizer", Oct. 25, 2018, 6 pages, Wikipedia, Retrieved from the Internet: <https://en.wikipedia.org/wiki/Frequency_synthesizer>.

* cited by examiner

DUAL WAVEFORMS FOR THREE-DIMENSIONAL IMAGING SYSTEMS AND METHODS THEREOF

This application claims the benefit of U.S. Provisional Patent Application Ser. No. 62/593,970, filed Dec. 3, 2017, U.S. Provisional Patent Application Ser. No. 62/643,014, filed Mar. 14, 2018, and U.S. Provisional Patent Application Ser. No. 62/667,442, filed May 5, 2018, which are all hereby incorporated by reference in their entirety.

FIELD

This technology generally relates to systems and methods for imaging and, more particularly, to systems and methods for three-dimensional imaging of a target through both clear and obscuring media with dual waveforms.

BACKGROUND

The state of the art in three-dimensional image-capturing technology has improved significantly in recent years, to the point where Video Graphics Array (VGA) level resolution, millimeter distance accuracy, and video frame rates can all be readily achieved when capturing 3D images of target scenes several meters away from the imager. These impressive performance characteristics are made possible largely because of the addition of image intensifiers to time-of-flight 3D image-capturing systems such that 3D image-capturing systems are no longer deficient of returned or back-reflected light. However, these 3D imaging systems are phase-measuring devices that are not capable of imaging target objects or scenes that are obscured, or even partially obscured, by atmospheric particulates such as rain, snow, smoke, fog, and so on, because the 3D imaging systems have no way to discriminate between a spurious reflection caused by an intervening particle and a desired reflection caused by the target object or target scene.

One such phase-measuring image-intensified 3D imaging system of the prior art is the range imaging system 10 illustrated in FIG. 1 of U.S. Pat. No. 6,288,776. As seen in FIG. 1 of U.S. Pat. No. 6,288,776 and in this application, this range imaging system 10 includes an image intensifier 26 and illuminator 14, both of which have inputs coupled to outputs of modulator 16. As set forth beginning at column 3, line 62 of U.S. Pat. No. 6,288,776, "The modulator 16 provides an amplitude varying sinusoidal modulation", and indeed the output beam 18 and reflected beam 20 are both shown to be sinusoidally modulated.

When sinusoidal emissions are reflected from both a particle and a portion of a target scene, the sinusoidal emissions add vectorally according to the formulae:

$$A = \sqrt{(I_0 R_P)^2 + (I_0 R_T)^2} \quad \text{Equation 1}$$

$$\phi = \tan^{-1}\left\{\frac{I_0 R_P \sin\phi_P + I_0 R_T \sin\phi_T}{I_0 R_P \cos\phi_P + I_0 R_T \cos\phi_T}\right\} \quad \text{Equation 2}$$

and the distance to a target 60 is $$d_T = \frac{c\phi}{4\pi f_{illum}} \quad \text{Equation 3}$$

where A is the amplitude of the total back-reflected light, $\phi$ is the phase of the sinusoidal modulation of the back-reflected light, $R_P$ is the reflectance of the particle, $R_T$ is the reflectance of the target, $\phi_P$ is the phase of the light reflected from the particle (which is proportional to its distance from the 3D imaging system), $\phi_T$ is the phase of the light reflected from the target (which is also proportional to its distance from the 3D imaging system), $f_{illum}$ is the modulation frequency of the output beam 18, and $I_0$ is the power of the incident light beam, which for simplicity is assumed to be the same for both the particle and the target. Equation 3 is used to compute the distance (in millimeters, for example) to the target, for each pixel, based upon the measured phase, $\phi$, (in radians, for example), for each pixel. It is important to note that, according to Equation 2, the phase of the target's return signal, $\phi_T$, is hopelessly confounded with the phase, $\phi_P$, of the particle such that the resulting phase, $\phi$, determination per Equation 2 is erroneous, and consequently the computed distance determination per Equation 3 will be erroneous as well.

One way to overcome the deficiencies of phase-measuring image-intensified 3D imaging systems is to instead employ pulsed-time-of-flight, or "Flash" 3D imaging methods. These methods, in which a pulse of light illuminates an entire target scene, together with range-gating the received light at the image intensifier, have been shown to be capable of capturing 3D images of a target object or target scene in the presence of veiling particulates. However, these prior 3D imaging systems configured for operations in flash 3D mode are relatively slow and inaccurate.

SUMMARY

A three-dimensional imaging system includes a light emission system, an image capture system and an image processing computing device. The light emission system is configured to be modulated with a selected one of a first waveform or a second waveform to output light directed at a target. The image capture system is configured to be modulated with the selected one of the first waveform or the second waveform to obtain an image from reflected light from the output light. The image processing computing device is coupled to the light emission system and the image capture system. The image processing computing device includes a processor and a memory comprising programmed instructions stored thereon, the processor configured to be capable of executing the stored programmed instructions to: adjust modulation of the light emission system and the image capture system between the first waveform or the second waveform based on a level of interference in a medium in which output light is directed into for imaging; and generate and provide a three-dimensional image based on the adjusted modulation of the light emission system and the image capture system and the obtained reflected light from the output light.

A method for making a three-dimensional imaging system includes providing A three-dimensional imaging system a light emission system configured to be modulated with a selected one a first waveform or a second waveform to output light directed at a target. An image capture system is provided that is configured to be modulated with the selected one of the first waveform or the second waveform to obtain an image from reflected light from the output light. The image processing computing device is coupled to the light emission system and the image capture system. The image processing computing device includes a processor and a memory comprising programmed instructions stored thereon, the processor configured to be capable of executing the stored programmed instructions to: adjust modulation of the light emission system and the image capture system between the first waveform or the second waveform based on a level of interference in a medium in which output light is directed into for imaging; and generate and provide a three-dimensional image based on the adjusted modulation of the light emission system and the image capture system and the obtained reflected light from the output light.

A three-dimensional imaging system includes an image intensification subsystem and an illumination subsystem that are both capable of operating with sinusoidal or pulsed waveforms in accordance with phase-measuring or flash modes of operation, respectfully, of the three-dimensional imaging system.

Accordingly, examples of this technology provide methods and apparatuses for improved three-dimensional imaging capable of detecting a presence or absence of any veiling particulates in between a three-dimensional imaging system and a target and adjusting between a flash-measuring mode and a phase-measuring mode based on this detection.

DETAILED DESCRIPTION

Figure 1:
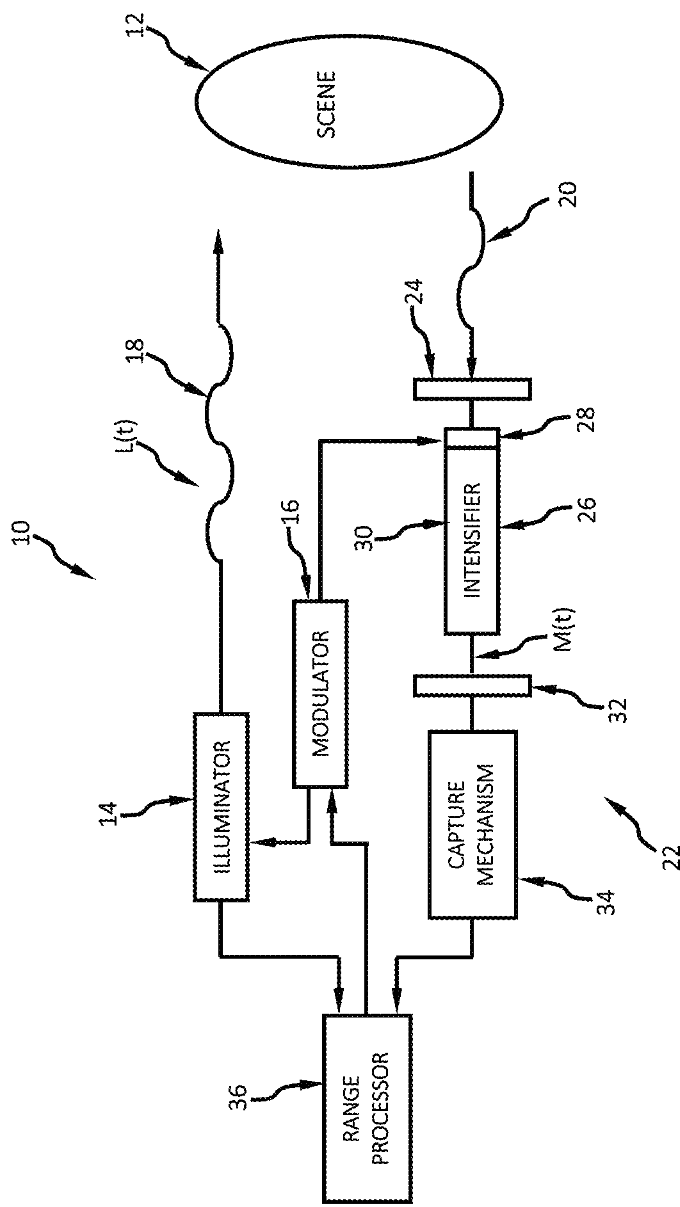
FIG. 1 is a block diagram of a prior art phase-measuring three-dimensional imaging system having an image intensifier.
Figure 2:
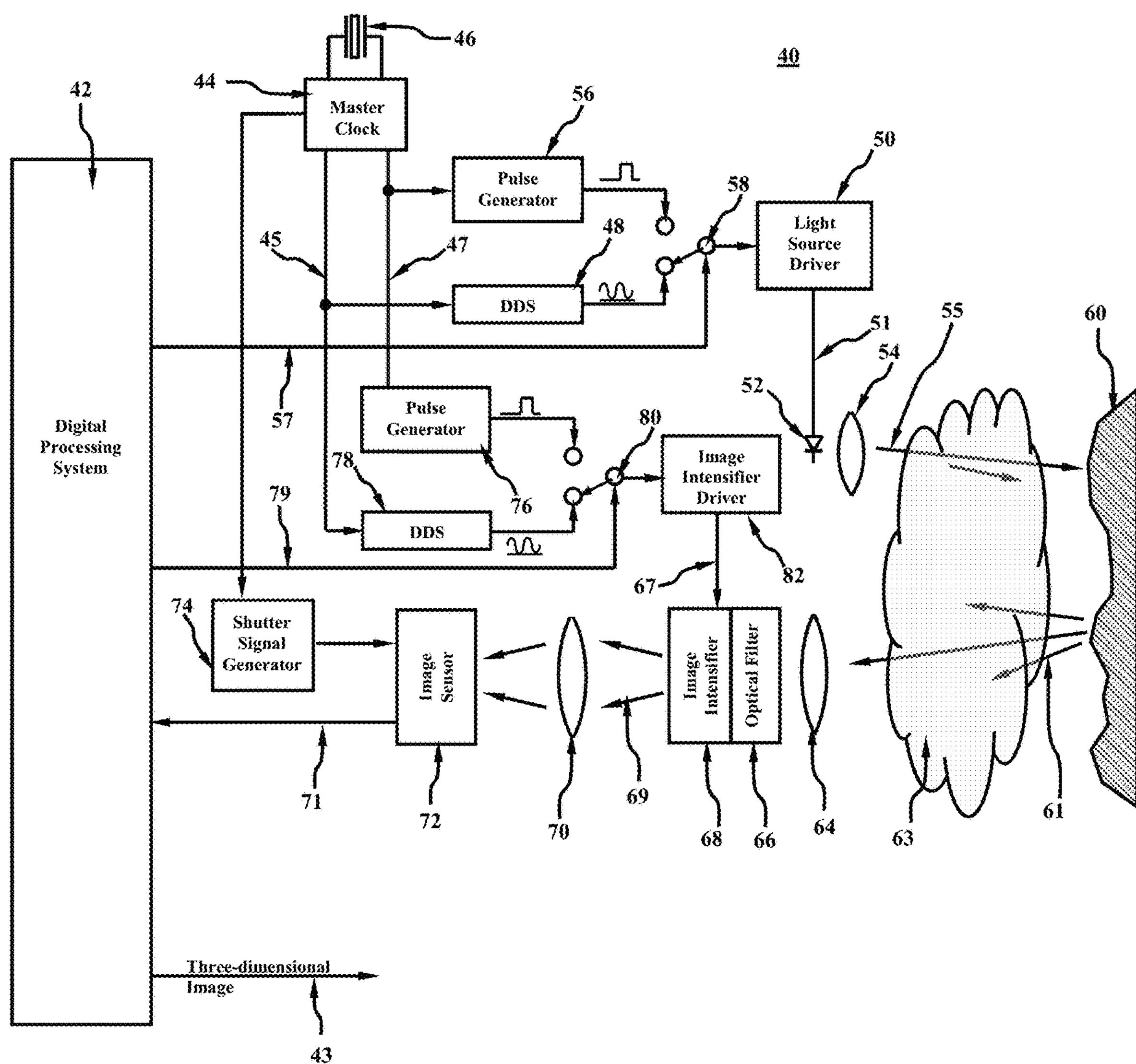
FIG. 2 is a block diagram of an example of a three-dimensional imaging system which can perform three-dimensional imaging through both clear and obscuring media.

An example of three-dimensional (3D) imaging system 40 (also known as range cameras or time-of-flight cameras) is illustrated in FIG. 2. The three-dimensional imaging system 40 captures all the image information of a conventional two-dimensional monochrome camera, plus spatial information along one additional axis. Typically, this third axis is along a radial direction away from the three-dimensional imaging system 40, and the additional information is in the form of a distance measurement. The three-dimensional imaging system 40 therefore measures the distance, or relative distance, to each image location in the target 60, such as a target object or target scene by way of example only, for each pixel comprising the captured image as described in detail below.

Referring more specifically to FIG. 2, the 3D imaging system 40 includes a digital processing system 42, a frequency source system comprising a master clock 44, a crystal oscillator 46, a source direct digital synthesizer (DDS) 48, a image intensifier direct digital synthesizer (DDS) 78, and pulse generators 56 and 76, a light emission system comprising a light source driver 50, a light source 52, and one or more light source lenses 54, and an image capture system comprising one or more imaging lens 64, an optical filter 66, an image intensifier 68, a relay lens 70, an image sensor 72, a shutter signal generator 74, and an image intensifier driver 82, although the 3D imaging system may comprise other types and/or numbers of other components or other elements in other configurations.

The digital processing system 42 includes a processing unit and a memory, although the digital processing system 42 can comprise other types of image processing computing devices and also may have other types and/or numbers of components or other elements in other configurations. The memory stores programmed instructions and data for capturing or otherwise generating a three-dimensional image using heterodyning, homodyning, or flash mode as described and illustrated by way of the examples herein for execution by the processing unit, although some or all of these instructions and data may be stored elsewhere. A variety of different types of memory storage devices, such as a random access memory (RAM), a read only memory (ROM), hard disk, CD ROM, USB thumb-drive, or other computer readable medium which is read from and/or written to by a magnetic, optical, or other reading and/or writing system coupled to the processing unit, can be used for the memory. By way of example only, the digital processing system 42 can be or include a conventional microprocessor with an external memory or digital processing system 42 can be or include a microcontroller with all memory located onboard. In another example, the digital processing system 42 can be or include a digital signal processor (DSP) integrated circuit, which is a microcomputer that has been optimized for digital signal processing applications, including Fourier transforms and image processing and image construction. The digital processing system 42 can be as simple as a sixteen-bit integer system for low-cost applications or digital processing system 42 can be a thirty-two bit, sixty-four bit, or higher, and/or a floating point system for higher performance when cost is not an issue. Also, by way of example only, the digital processing system 42 can be an FPGA (Field-programmable gate array) or a CPLD (complex programmable logic device) which are attractive for use in examples of this technology owing to their compact and cost-effective hardware implementations.

When in Continuous Wave (CW) mode the algorithmic computations taking place within the digital processing system 42 flows from the need to perform phase and amplitude calculations of a Discrete Fourier Transform (DFT) for each pixel of the three-dimensional image. This need in turn follows from the heterodyne (or homodyne) signal output by the fluorescent screen of the image intensifier 68. The mathematics of the heterodyne and DFT processes are provided herein.

The frequency source system comprises the master clock 44, the crystal oscillator 46, the source direct digital synthesizer (DDS) 48, the image intensifier direct digital synthesizer (DDS) 78, and the pulse generators 56 and 76, although the frequency source system can have other types and/or numbers of components or other elements in other configurations.

The crystal oscillator 46 in conjunction with the master clock 44 generate frequencies that are needed for use by the heterodyne/homodyne DDS circuits 48 and 78, as well as for use with the pulse generator circuits 56 and 76 associated with flash mode operation, and for the shutter signal generator 74, although the frequencies can be generated or provided in other manners. In particular, in this example the crystal oscillator 46 is configured to generate a frequency, $f_{clk}$, utilized by the master clock 44 to generate the master clock signal 45.

The master clock signal 45 output by the master clock 44 is coupled to an input of source DDS 48, which has an output coupled to an input of light source signal switch 58 which in turn is coupled to an input of the light source driver 50. The master clock signal 45 output by the master clock 44 is also coupled to an input of the image intensifier DDS 78, which has an output coupled to an input of image intensifier signal switch 80 which in turn is coupled to an input of the image intensifier driver 82. Master clock 44 also generates the pulse clock signal 47 which is coupled to an input of the source pulse generator 56 and has an output coupled to an input of light source signal switch 58. The pulse clock signal 47 from the master clock 44 is also coupled to an input of the image intensifier pulse generator 76 which has an output coupled to an input of image intensifier signal switch 80. Light source signal switch 58 is controlled by the digital processing system 42 by way of light switch control line 57 and image intensifier signal switch 80 is controlled by the digital processing system 42 by way of intensifier switch control line 79.

The source DDS 48 and image intensifier DDS 78 are frequency-synthesizing electronic circuits that generate and output a wide range of frequencies and phase from an input reference frequency, namely the master clock signal 45. A DDS works by way of converting the input frequency to an output frequency according to the formula $f_{out}=f_{in}\times TW/2^{32}$, where $f_{out}$ is the output frequency (e.g., the frequency of source DDS 48 output), $f_{in}$ is the input frequency (i.e., the frequency of the reference clock signal 45), and TW is a tuning word programmed into the DDS by the digital processing system 42. As an example, if $f_{in}=f_{clk}=134{,}217{,}728$ Hertz, TW is 800,000,000, then $f_{out}=25{,}000{,}000$ Hertz. As another example, if $f_{in}=f_{clk}=134{,}217{,}728$ Hertz, $TW_2$ is 800,000,512, then $f_{out}=25{,}000{,}016$ Hertz.

The light source pulse generator 56 is an electronic circuit whose output is a short electrical pulse, having a pulse width of between 1 ps and 1 μs, and an amplitude and impedance needed to drive the light source driver 50. The light source pulse generator 56 generates an output pulse in response to the arrival of a pulse clock signal 47 from the master clock circuit 44 at the input of the source pulse generator 56. When in flash mode light source signal switch 58 is in its upper position and the output of light source pulse generator 56 is coupled to an input of light source driver 50 through light source signal switch 58.

The short electrical pulse output by the source pulse generator 56 is coupled through the light source signal switch 58 to the light source driver 50 which amplifies and level-shifts the input pulse signal to a level suitable for driving the light source 52. The light source 52 then produces a short pulse of intense illuminating light 55 that has a duration substantially equal to the width of the electrical pulse output by the source pulse generator 56.

The additional circuitry to support flash mode operation within three-dimensional imager 40 includes an additional output signal from the master clock 44, namely the pulse clock signal 47, which is coupled to an input of image intensifier pulse generator 76. An output of the image intensifier pulse generator 76 is coupled to an input of image intensifier signal switch 80. When in flash mode, the output of the image intensifier pulse generator 76 image intensifier signal is coupled through image intensifier signal switch 80 to an input of image intensifier driver 82.

In particular, for flash mode the timing signals output by the master clock 44 determine the time between light flashes or pulses of illuminating light 55 produced by the light source 52. Also for flash mode, additional timing signals output by the master clock 44 determine the time between image intensifier gate pulses of image intensifier drive signal 67 (which gate On or Off the intensification gain of the image intensifier 68) the time being between one second and 100 ps, and, optionally, the duration of the image intensifier gate pulses of image intensifier drive signal 67 signal, the duration being between one femtosecond and one second. The image intensifier 68 then turns from Off to On to Off in accordance with the voltage levels of the pulse produced by the image intensifier driver 82. The image intensifier 68 is gated On for a duration substantially equal to the width of the electrical pulse output by the image intensifier pulse generator 76.

The light emission system comprises the light source driver 50, the light source 52, and in this example a light source lens 54, although the light emission system may comprise other types and/or numbers of other components or other elements in other configurations. Light source driver 50 amplifies and level-shifts the signal input to light source driver 50 from light source signal switch 58, and outputs the amplified and level-shifted electronic light source drive signal 51 to an input of light source 52. Light source 52 thereupon emits illuminating light 55, through light source lens 54, where the illuminating light 55 is modulated in accordance with the electronic light source drive signal 51 input to light source 52.

The light source 52 converts the light source drive signal 51 output by the light source driver 50 circuit into an electromagnetic emission, such as an optical wavelength of light, that is subsequently used to illuminate the target 60. The light source 52 can be a laser, a diode laser, an LED (light emitting diode), or a SLED (super-luminescent light emitting diode), and can be a single emitter of light, or a plurality of emitters. Note that whatever wavelength the light source 52 emits, the illuminating light must be modulated in accordance with either a sinusoidally modulated light source drive signal when in CW mode, or a high-bandwidth pulse when in flash mode. As such, light source 52 must also be able to produce both a sinusoidally modulated light or a very short high-bandwidth light pulse. Since the maximum bandwidth of most LED emitters is approximately 50 MHz, an LED is not an optimal device to be used as the light source 52 for producing short high-bandwidth pulses in flash mode. Instead, light source 52 can be a diode laser. Diode lasers typically have a bandwidth exceeding 1 GHz and are quite capable of producing the short intense light pulses needed for flash mode operation. However, diode lasers can have eye-safety concerns when operating in a continuous modulation mode, such as seen when the three-dimensional imaging system is operating in CW mode. Therefore it is beneficial for a three-dimensional imaging system 40 to utilize both an LED device (in CW mode) as the light source 52 and a diode laser device (in flash mode) as the light source 52.

The illuminating light 55 produced by the light source 52 can be in the ultraviolet, visible, or infrared, regions of the spectrum, but must emit a wavelength that the photocathode of the image intensifier 68 is responsive to. Illuminating light 55 may pass through a scattering medium 63 on its way to the target 60 or the medium between the three-dimensional imaging system 40 and the target 60 may be clear and free from scattering artifacts. Scattering artifacts of scattering medium 63 can include microscopic particles such as smoke and fog, as well as non-microscopic particles such as rain, sleet, or snow. Scattering artifacts of scattering medium 63 can prevent the use of sinusoidal modulation waveforms for the illuminating light 55 (and accordingly the gain modulation of the image intensifier 68) as described earlier in the Background of this application.

The image capture system may comprise the imaging lens 64, the optical filter 66, the image intensifier 68, the relay lens 70, the image sensor 72, the shutter signal generator 74, and the image intensifier driver 82, although the image capture system may comprise other types and/or numbers of other components or other elements in other configurations. Imaging lens 64 causes the back-reflected light 61 incident upon the imaging lens 64 to be focused onto the photocathode of image intensifier 68 through optical filter 66.

A portion of the illuminating light 55 that is incident on the target 60 is reflected as back-reflected light 61 and which also optionally passes through scattering medium 63 to and/or from the three-dimensional imager 40. Another portion of the illuminating light 55 that does reach the target 60 may be partially back-reflected as back-reflected light 61. At least a portion of this back-reflected light 61 may be collected by and pass through an imaging lens 64 and a bandpass optical filter 66 before becoming incident on the photocathode of image intensifier 68.

Meanwhile, image intensifier driver 82 may amplify and level-shift the signal input from the image intensifier signal switch 80 and may output the amplified and level-shifted electronic image intensifier drive signal 67 to an input of image intensifier 68. Image intensifier 68 thereupon has its intensification gain modulated in accordance with the image intensifier drive signal 67 input to image intensifier 68 from the image intensifier driver 82

Accordingly, back-reflected light 61 that is imaged onto the photocathode of the image intensifier 68 is converted into electrons by the photocathode. The electrons enter the micro-channel plate section of the image intensifier 68 and as discussed above may be amplified or intensified by several orders of magnitude, and accelerated, before striking the fluorescent screen section of the image intensifier 68. Consequently, an amplified or intensified image of the image focused on the photocathode is generated and presented on the fluorescent screen of the image intensifier 68.

The gated and intensified optical signal is then output on the fluorescent screen of the image intensifier 68, and the screen output light 69 produced by the fluorescent screen may then be imaged by relay lens 70 which causes an image of the image presented on the fluorescent screen to be formed on the light-sensitive input face of image sensor 72. The image sensor 72 thereupon captures the image formed thereon under the control of the signal input to image sensor 72 from an output of shutter signal generator 74, converts the image into an electronic format, and transmits the electronic image to the digital processing system 42 over image sensor output line 71.

In this example, the architecture of the three-dimensional imaging system 40 allows for two modes of operation: a continuous wave (CW) mode in which the modulation or waveform of the illuminating light 55 and the modulation or waveform of the gain of the image intensifier 68 are both analog, cyclical, or otherwise continuous, and a flash mode in which the modulation or waveform of the illuminating light 55 and the modulation or waveform of the gain of the image intensifier 68 are both digital, pulsed, or substantially binary. In particular, when light source signal switch 58 and image intensifier signal switch 80 are in the positions as shown in FIG. 2 (as controlled by digital processing system 42 by way of light switch control line 57 and intensifier switch control line 79, respectively), the illuminating light 55 is modulated with a continuous sinusoidal waveform generated by source DDS 48, and the gain of image intensifier 68 is modulated with a continuous sinusoidal waveform generated by image intensifier DDS 78. This CW mode of operation is a commonly used abbreviation for Continuous Wave. By "continuous" it is meant that the emitted wave, or the waveform under consideration, has a duration for at least one millisecond of time. Note that the continuous waveform is preferentially sinusoidal, but can be any periodic analog waveform, such as a triangular wave or a trapezoidal waveform by way of example only Alternately when light source signal switch 58 and image intensifier signal switch 80 are in the other position, i.e. coupled to the pulse generator 56 and the pulse generator 76, the illuminating light 55 is modulated with a substantially binary pulse waveform generated by source pulse generator 56, and the gain of image intensifier 68 is modulated with a substantially binary pulse waveform generated by image intensifier pulse generator 76. This mode of operation is referred to as "flash mode". The position of light source signal switch 58 and image intensifier signal switch 80 are under the control of the digital processing system 42. Therefore, in this example the three-dimensional imaging system 40 is capable of obtaining three dimensional images with at least these two modes of operation.

In the CW mode a continuous waveform type or modulation is applied to the output of the light source 52 and the gain of the image intensifier 68, and in the flash mode a pulsed or binary waveform type or modulation is applied to the output of the light source 52 and the gain of the image intensifier 68. The ability of the intensification gain of image intensifier 68 to be controlled in accordance with image intensifier drive signal 67 output by the image intensifier driver 82 leads to the ability of image intensifier 68 to effect a heterodyning or homodyning process. In the image intensifier's 68 heterodyning or homodyning process the image signal within the microchannel plate (originating with the photocathode image) of image intensifier 68 is multiplied with the image intensifier drive signal 67. Note that homodyning is the same as heterodyning except in homodyning the two frequencies being multiplied are substantially the same but wherein the phase of one of the signals is being varied. The output of the heterodyning or homodyning process is presented on the fluorescent screen of the image intensifier 68, which mathematically is represented as Equation 4:

$$FS_i(t)=O_{FS}+A_{FS}\cos(2\pi f_{fs}t-\phi_i). \quad \text{Equation 4}$$

Equation 4 tells us that the brightness of the fluorescent screen at the location of the i'th pixel varies sinusoidally in time, t, at a frequency of $f_{fs}$, and with a phase $\phi_i$. The frequency term, $f_{fs}$, is equal to the difference between the frequency of the image intensifier drive signal 67 (namely $f_{II}$) and the frequency of the light source drive signal 51 (namely $f_{illum}$). As an example, if $f_{II}$ is 25,000,016 Hz and $f_{illum}$ is 25,000,000 Hz, then $f_{fs}$=25,000,016−25,000,000 Hz=16.0 Hz. This means that the brightness of the image present on the fluorescent screen will vary sinusoidally at a rate of 16.0 cycles/second, in this example. Note that both the image sensor 72 and fluorescent screen of the image intensifier 68 are operative at this relatively low frequency.

The phase term $\phi_i$ carries information about the distance to the target 60. The phase of the i'th pixel varies as a function of emission modulation frequency, $f_{illum}$ and distance, $d_i$, to the target at the location corresponding to the i'th image sensor pixel according to the formula:

$$\phi_i = \frac{4\pi f_{illum} d_i}{c} + \frac{n\pi}{2} \quad \text{Equation 5}$$

where c is the speed of light. In heterodyne operation, n=0, and the phase is not varied in π/2 steps within the image intensifier drive signal 67 or the light source drive signal 51. However, in homodyne operation where $f_{fs}$=0.0 Hz, the phase of either the image intensifier drive signal 67 or the light source drive signal 51 is incremented by π/2 radians between successive frames captured by image sensor 72, assuming a four-point DFT. In homodyne operation, the π/2 term of equation 5 can be re-expressed as n×Δϕ, where Δϕ is the phase shift and is equal to 2π/N, where N is the number of points in the DFT, so, for example if N=4 then Δϕ=π/2. As a heterodyne example, if $f_{illum}$ is 25,000,000 Hz, c=3×10$^8$ m/s, and $d_i$=3 meters, then the phase $\phi_i$ associated with the i'th pixel is π radians. Knowing the phase associated with each pixel, or the phase of a pixel relative to the other pixels in a phase-image or phase-map allows one to determine the relative distance of one pixel relative to the relative distances of the others by re-arranging Equation 5 to form Equation 6 (note that Equation 6 is very similar to Equation 3):

$$d_i = \frac{c\phi_i}{4\pi f_{illum}} \quad \text{Equation 6}$$

Therefore, the next step is to mathematically determine the phase, or relative phase, $\phi_i$, at each of the i'th pixels in order to develop phase and distance maps.

One way to compute the phase of a sinusoidal waveform—or the phase of any repeating or cyclical waveform—is with the use of a Fourier Transform. The mathematical definition of a Fourier Transform is $$X(m) = \sum_{k}^{N-1} x_k \left[\cos\frac{2\pi mk}{N} + i\sin\frac{2\pi mk}{N}\right] \quad \text{Equation 7}$$

where $x_k$ is the k'th sample along one cycle of the sinusoid whose phase is to be determined (namely $FS_i(t)$), k is the sample counter, X(m) is the frequency domain signal and is a complex number, m is the frequency counter, N is the number of points used in calculating the transform, and i is the square root of −1. X(m), being a complex number, can be restated as:

$$X(m) = \mathrm{Re}(m) + i\mathrm{Im}(m) \quad \text{Equation 8}$$

Where Re is the real part and Im is the imaginary part. The magnitude of the m'th frequency component is $$A(m) = \sqrt{\mathrm{Re}^2(m) + \mathrm{Im}^2(m)} \quad \text{Equation 9}$$

and the phase of the m'th frequency is $$\phi(m) = \tan^{-1}\frac{\mathrm{Im}(m)}{\mathrm{Re}(m)}. \quad \text{Equation 10}$$

For distance estimation, only the phase of the fundamental frequency m=1 is required. Further simplifications can be made by sampling the sinusoid exactly four times per cycle (i.e., π/2 radians apart), which results in what is known as a four-point Discrete Fourier Transform (DFT). For this four-point transform, where N=4 and k=0, 1, 2, and 3, Equation 7 simplifies to $$X(1) = x_0 + ix_1 - x_2 + ix_3 \quad \text{Equation 11}$$

It is seen that Re(1)=$x_0-x_2$ and Im(1)=$x_1-x_3$, and the phase at the i'th pixel is $$\phi = \tan^{-1}\frac{x_1 - x_3}{x_0 - x_2} \quad \text{Equation 12}$$

and the amplitude at the i'th is $$A = \sqrt{(x_0-x_2)^2 + (x_1-x_1)^2}. \quad \text{Equation 13}$$

The phase and amplitude determinations are made from only four data points or samples, $x_0$, $x_1$, $x_2$, and $x_3$, obtained directly from the four successive images from image sensor 72 of the fluorescent screen signal FS(t), for each pixel. Furthermore, each of the four frames will be π/2 radians apart (again assuming N=4 point DFT) along the FS(t) waveform, and each frame contains an $x_m$ data point for all of the pixels of the digitized image. In particular, the first image frame captured by the image sensor 72 has the $x_0$ data for all of the pixels of the digitized image, the second image frame captured by the image sensor 72 has the $x_1$ data for all of the pixels of the digitized image, the third image frame captured by the image sensor 72 has the $x_2$ data for all of the pixels of the digitized image, and the fourth (and last, assuming a 4-pt DFT) image frame captured by the image sensor 72 has the $x_3$ data for all of the pixels of the digitized image.

The first, second, third, and fourth images may be transmitted by the image sensor 72 over image sensor output line 71 to the image processing system 42 as these images are captured. Next, the image processing system 42 may process the $x_0$, $x_1$, $x_2$, and $x_3$ data as described above to compute the phase and amplitude for each pixel. Image processing system 42 then converts the phase, ϕ, information to distance by use of the Equation 6 for each pixel of the image. The image processing system 42 arranges the pixel distance data into a two-dimensional array which is used to represent the relative distance of each point in the target 60 corresponding to the location in the two-dimensional array, meaning the array is a "distance image" of the target 60. Finally, the image processing system 42 can then arrange the pixel amplitude data into a two-dimensional array which is used to represent the relative reflectance of each point in the target 60 corresponding to the location in the two-dimensional array, meaning the array is substantially a standard monochrome bitmapped image of the target 60.

The preceding description of the CW mode of operation pertains to the case where the interstitial medium between the three-dimensional imaging system 40 and the target 60 is substantially free from a disruptive scattering medium 63, in which case the phase-measuring algorithm will provide good distance and amplitude estimates for each pixel of the target 60. However, if the interstitial medium does include a disruptive scattering medium 63 then the phase-measuring algorithm will yield inaccurate distance and amplitude measurements, and the three-dimensional imaging system 40 must instead operate in flash mode. Accordingly, as illustrated and described in the examples herein the three-dimensional imaging system 40 is able to detect when there is a disruptive scattering medium 63 to switch to the flash mode and when the disruptive scattering medium 63 dissipates to switch back to CW mode.

In the flash mode of operation the three-dimensional imaging system 40 emits illuminating light 55 that comprises a short intense pulse of light that is used to illuminate the target 60 instead of with sinusoidally modulated illuminating light 55, and the pulse back-reflected light 61 is range-gated with the image intensifier 68 over several pulse/range-gate time sequences to construct a three-dimensional image of the target 60. As such, much of the flash mode electro-optical hardware within three-dimensional imaging system 40 is common with the CW mode electro-optical hardware within three-dimensional imaging system 40. The common functional blocks, as noted with reference to FIG. 2, include at least crystal oscillator 46, master clock 44, digital processing system 42, shutter signal generator 74, image sensor 72, relay lens 70, image intensifier 68, optical filter 66, imaging lens 64, and image intensifier driver 82. Indeed, taking advantage of this common hardware, and incorporating both flash mode and CW mode of operation and hardware into a three-dimensional imaging system 40 allows the three-dimensional imaging system 40 to operate in high-performance CW mode when scattering medium 63 is not present, and in a lower performance flash mode that is able to capture 3D images of a target 60 through a scattering medium 63 such as fog, rain, snow, and smoke.

An example of the operation of the 3D imaging system 40 in flash mode will now be described with reference to FIGS. 2 and 3A through 3I. When a flash mode 3D imaging process begins, the digital processing system 42 commands the image intensifier signal switch 80, by way of light switch control line 57, to switch to that position that couples the image intensifier pulse generator 76 to the image intensifier driver 82 so that the image intensifier 68 operates with binary On-Off modulation instead of a sinusoidal modulation fashion, and the digital processing system 42 commands the light source signal switch 58, by way of intensifier switch control line 79, to switch to that position which couples the light source pulse generator 56 to the light source driver 50 so that the light source 52 operates to emit binary light pulses instead of a sinusoidal waveform. Next, the master clock 44, under the control of the digital processing system 42 outputs binary digital signals by way of pulse clock signal 47 to the image intensifier pulse generator 76 and to the light source pulse generator 56. The pulses generated and output by the light source pulse generator 56 in accordance with the pulses input to light source pulse generator 56 from the master clock 44, are coupled through the light source signal switch 58 to an input of the light source driver 50 which in turn amplifies and level-shifts the pulses produced by the light source pulse generator 56 to a level suitable for driving the light source 52. The light source 52 thereupon emits illuminating light 55 that is pulsed in accordance with the pulses produced by the light source pulse generator 56. The pulses generated and output by the image intensifier pulse generator 76 in accordance with the pulses input to image intensifier pulse generator 76 from the master clock 44, are coupled through the image intensifier signal switch 80 to the image intensifier driver 82 which in turn amplifies and level-shifts the pulses produced by the image intensifier pulse generator 76 to a level suitable for driving the image intensifier 68. The image intensifier 68 thereupon turns On and Off in a binary fashion in accordance with the pulses produced by the image intensifier pulse generator 76. Additionally, the master clock 44, under the control of the digital processing system 42, outputs binary digital signals to the shutter signal generator 74 which in turn generates and outputs electronic shutter signals to the image sensor 72 that causes the image sensor 72 to commence and terminate image-capturing in accordance with the binary digital signals input to the shutter signal generator 74 from the master clock 44.

In flash mode operation of the three-dimensional 3D imager 40, the timing relationship between the pulses of the illuminating light 55, the pulses of the image intensifier drive signal 67 which cause the turning On and Off of the image intensifier 68, and the shutter control signals input to the image sensor 72 are critical.

Figure 3A:
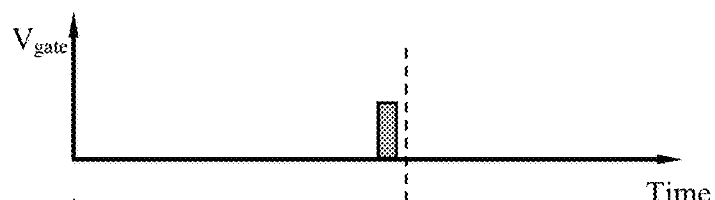
FIGS. 3A through 3I are example of graphs that illustrate the concept of range-gating for three-dimensional imaging through obscuring media.
Figure 3B:
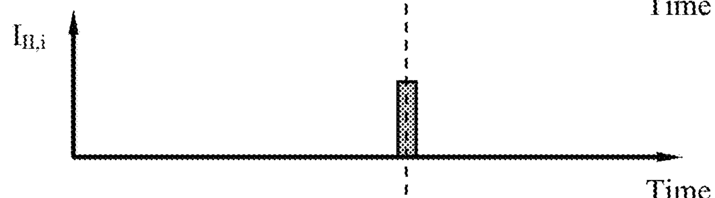
Figure 3C:
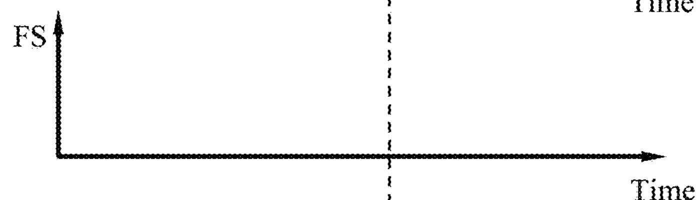
Figure 3D:
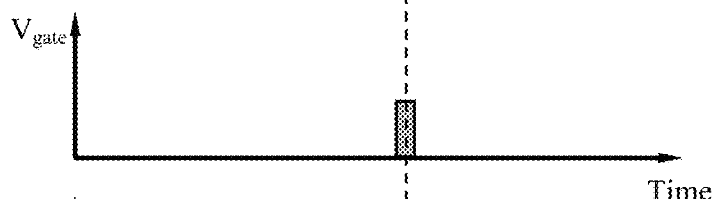
Figure 3E:
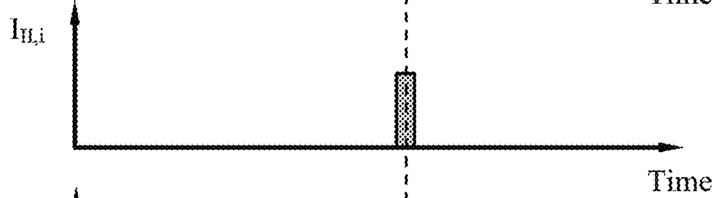
Figure 3F:
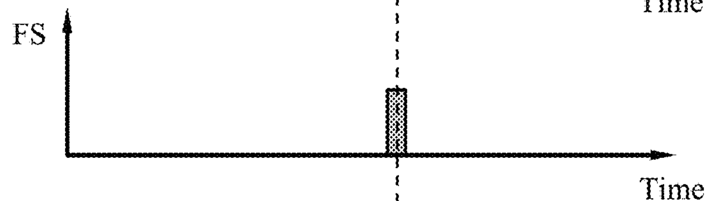
Figure 3G:
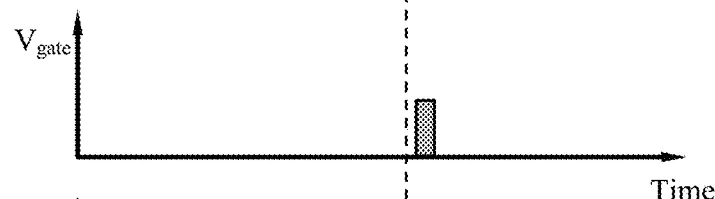
Figure 3H:
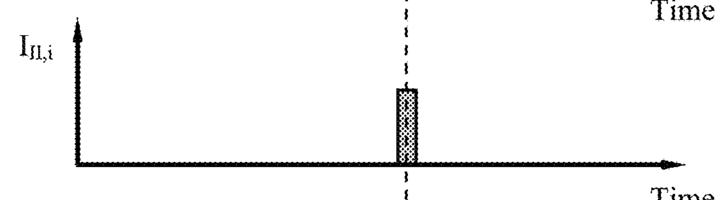
Figure 3I:
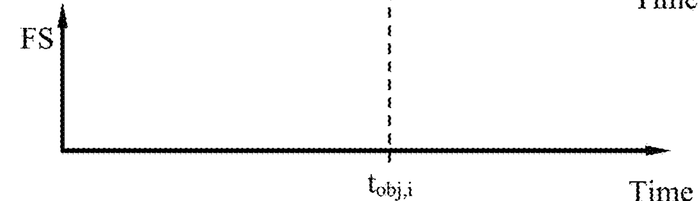

With closer reference to FIGS. 3A through 3I, FIGS. 3B, 3E, and 3H show the timing relationship of the back-reflected light 61 pulse, $I_{II,i}$ on the input face (i.e., the photocathode) of the image intensifier 68 in a location corresponding to the i'th pixel of the image sensor 72. The location in time of the pulse $I_{II,i}$ is determined by the location in time of the illuminating light 55 pulse, and the round-trip travel time of the light pulse from the light source 52 to the target 60 and back to the image intensifier 68 in accordance with Equation 14, below. Note the distance between the three-dimensional imaging system 40 and the target 60 is assumed to be constant (i.e., the target 60 and the three-dimensional imaging system 40 are not moving relative to one another) because the time of the $I_{II,i}$ pulse in FIG. 3B, FIG. 3E, and FIG. 3H is the same. Shown in FIGS. 3A, 3D, and 3G is the quantity $V_{gate}$, which illustrates the time at which the image intensifier drive signal 67 pulse arrives at the image intensifier 68 from the image intensifier driver 82, and correspondingly is the time at which the image intensifier 68 turns On. That is, the image intensifier 68 is On when $V_{gate}$ is at a high level and the image intensifier 68 is Off when $V_{gate}$ is at a low level; when On the image intensifier 68 has a high intensification gain, such as 5000, and when Off the image intensifier 68 has a low intensification gain, such as 0.001. Note that the location of $V_{gate}$ in time is not constant, but instead advances in time (i.e., occurs later in time) from FIG. 3A to FIG. 3D to FIG. 3G. This incrementally advancing time location of $V_{gate}$ occurs in accordance with the image intensifier pulse signal (which also is advancing incrementally in time) output by the image intensifier pulse generator 76. Also shown in FIGS. 3C, 3F, and 3H are the outputs produced by the fluorescent screen of the image intensifier 68 at a location corresponding to the i'th pixel of the image sensor 72, a quantity shown as $FS_i$ for three different timing relationships between $V_{gate}$ and $I_{II,i}$. Recall that the output on the fluorescent screen of the image intensifier 72 is proportional to the gate signal, or $V_{gate}$, as well as proportional to the optical signal incident, $I_{II,i}$, on the photocathode of the image intensifier 68. If either or both of $V_{gate}$ or $I_{II,i}$ is low at the same time, the corresponding location on the fluorescent screen (i.e., $FS_i$) will be low (i.e., very dark or black) as well. Accordingly, $FS_i$ is shown to be low in FIG. 3C where the $V_{gate}$ pulse and the $I_{II,i}$ pulse do not coincide because the $I_{II,i}$ pulse occurs after the $V_{gate}$ pulse (i.e., the back-reflected light 61 pulse from the target 60 arrives after the image intensifier 68 has already turned Off) and in FIG. 3G where the $V_{gate}$ pulse and the $I_{II,i}$ pulse again do not coincide because the pulse of $I_{II,i}$ occurs before the $V_{gate}$ pulse (i.e., the back-reflected light 61 pulse from the target 60 arrives before the image intensifier 68 has turned On). Finally, in FIG. 3E the $V_{gate}$ pulse and the $I_{II,i}$ pulse coincide in time because the back-reflected light 61 pulse from the target 60 arrives during that time when the image intensifier 68 has turned On. "Scanning" the $V_{gate}$ signal in time in this manner and inspecting the light output at the fluorescent screen (i.e., $FS_i$) of the image intensifier 68 during this process, allows the flash mode of operation of three-dimensional imaging system 40 to localize in time the return pulses within the back-reflected light 61 for each of the pixels. Note that the image sensor 72, under the control of the shutter signal generator 74, captures images of the fluorescent screen during this process and obtains images of fluorescent screen image FS.

The images captured by image sensor 72 are output from the image sensor 72 to the digital processing system 42 which inspects the images to determine which pixels are "lit", or, not black, meaning that the object of the lit pixel is within the distance window dictated by the timing and duration of the $V_{gate}$ pulse at the image intensifier 68. By scanning the $V_{gate}$ pulse in time and noting when any or all of the pixels are lit, the digital processing system 42 can construct a distance map of the target 60. Note this distance map will be less accurate and take longer to construct than a distance map constructed with a heterodyne/homodyne process, but (unlike the heterodyne/homodyne process) has the advantage of being able to work in the presence of a scattering medium 63 due to the range-gating effect of the temporally scanned $V_{gate}$ signal.

As a simple example of a range-gated flash mode of operation, let the width of $V_{gate}$ (the temporal width of the pulse of the image intensifier drive signal 67) be 1 ns, and the width of $I_{II,i}$ also be 1 ns. Furthermore, let the location in time of the $V_{gate}$ pulse increase by 1 ns relative to the location in time of the pulse of light source drive signal 51 driving the light source 52. For example, the first $V_{gate}$ pulse can occur 10 ns after the light source driver pulse, then the second $V_{gate}$ pulse would occur 11 ns after the next light source driver pulse, the third $V_{gate}$ pulse would occur 12 ns after the next light source driver pulse, and so on. Also let test object 60 have a location on it at a location corresponding to the i'th pixel of image sensor 72, and the spot is located 6.0 meters from the three-dimensional imaging system. Also, the round-trip travel time of a pulse of illuminating light 55 emitted from the light source 52 and subsequently received at the image intensifier 68 follows from the formula:

$$t=2d/c \quad \text{Equation 14}$$

where t is time, d is the distance between the three-dimensional imaging system 40 and test object 60, and c is the speed of light, being approximately $3\times10^8$ meters/sec. If d is 6.0 meters, then $t=6\times5/3\times10^8=100$ ns. That is, in the present example a pulse of light emitted by light source 52 and back-reflected from the i'th location of test object 60 will be received at the image intensifier 68 when 100 ns has passed from the initial light emission. Also, a signal will not appear on the fluorescent screen of the image intensifier 68 until the $90^{th}$ $V_{gate}$ pulse (10 ns+90×1 ns=100 ns), indicating a coincidence in time of the $V_{gate}$ pulse and the occurrence of of $I_{II,i}$ at the image intensifier 68. The digital processing system 42, that keeps track of the $V_{gate}$ pulse count, will know that i'th pixel has a signal on the fluorescent screen of image intensifier at the $90^{th}$ $V_{gate}$ pulse and the distance to the i'th location of test object 60 is therefore 6.0 meters. The digital processing system 42 keeps track of the pulse-count, and equivalently the round-trip pulse travel time, associated with each of the pixels of image sensor 72 and builds up a distance image accordingly.

When operating in flash mode and capturing 3D images in the presence of scattering medium 63, the corresponding $FS_i$ signals due to back-reflections from scattering medium 63 will be spatially and temporally uniform and easily detectable by digital processing system 42 after they are captured by image sensor 72. When digital processing system 42 detects these spurious back-reflections from scattering medium 63, digital processing system 42 will gate, block, or otherwise ignoring the weak, diffuse, or uniform back-reflections from the scattering medium 63, and not include them in the construction of a 3D image of the target 60.

Figure 4:
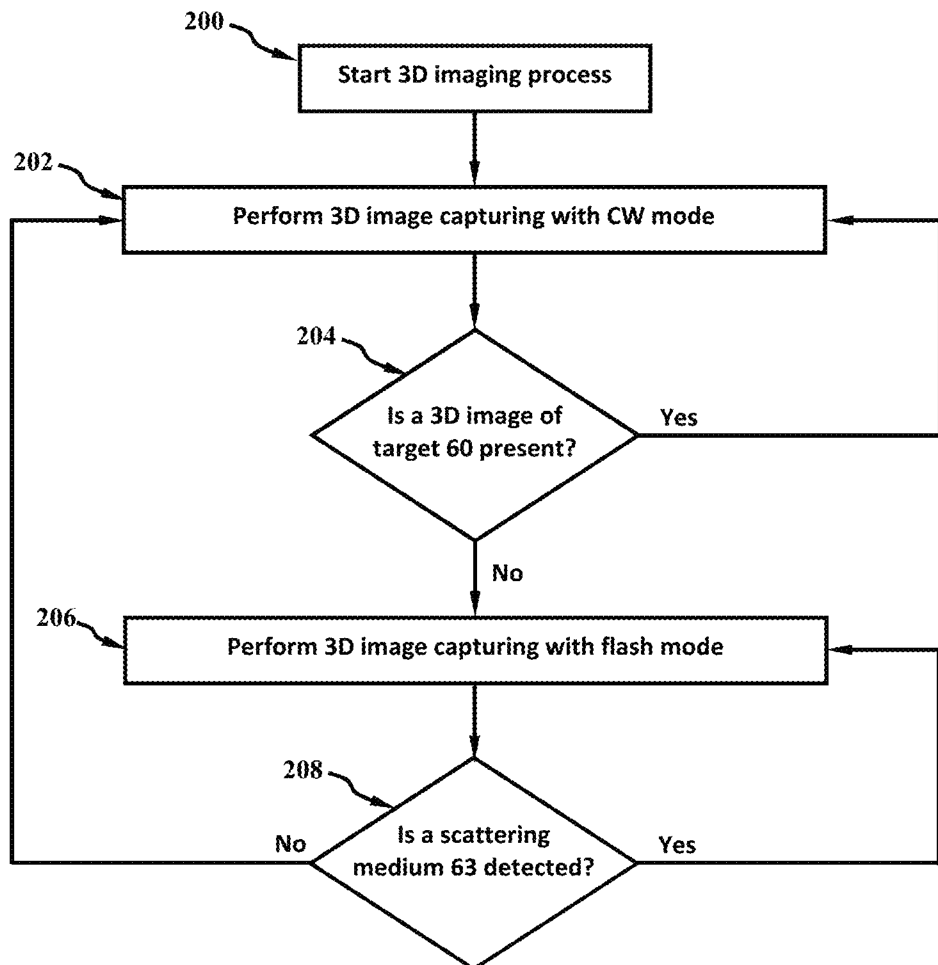
FIG. 4 is a flowchart of an example of a method for determining when to operate in Continuous Wave (CW) mode or flash mode.

An example of a method for determining when to operate in CW mode or flash mode in the three-dimensional imaging system 40 is illustrated in the flowchart of FIG. 4. In step 200, the three-dimensional imaging process is initiated in the three-dimensional imaging system 40.

In step 202 the three-dimensional imaging system 40 captures 3D images with the CW mode of operation in which illuminating light 55 is sinusoidally modulated, the gain of the image intensifier 68 is also sinusoidally modulated, and the digital processing system 42 processes images received from the image sensor in accordance with equations 12, 13, and 6. After one or more 3D images are captured in CW mode, digital processing system 42 inspects the one or more 3D images to determine if a 3D image of a target 60 is present, if the 3D image just contains noise, or if the 3D image just contains a uniform low-level signal, if the 3D image just contains low-contrast features, or if the 3D image is otherwise featureless in which case no 3D image of a target 60 is present in the captured 3D image.

In step 204 the digital processing system 42 determines when a 3D image of a target 60 is present in the captured 3D image. If in step 204 the digital processing system 42 determines that a 3D image of a target 60 is present, then the Yes branch is taken back to step 202 and the three-dimensional imaging system 40 proceeds with capturing a 3D image in CW mode. If in step 204, the digital processing system 42 determines that a 3D image of a target 60 is not present in the captured 3D image, then the No branch is taken to step 206.

In step 206, the three-dimensional imaging system 40 captures 3D images of target 60 with flash mode under the assumption that a scattering medium 63 is present in the space between the three-dimensional imaging system 40 and the target 60. Note that the 3D images captured in step 206 in flash mode are generally of poorer quality than the 3D images captured in step 202, and it is desirable to revert to CW mode of operation as soon as the scattering medium has been determined to have dissipated or otherwise removed.

Accordingly, in step 208, the digital processing system 42 periodically inspects 3D images captured in flash mode for evidence of back-scattering from a medium 63 (in which case a weak but significant amount of signal $FS_i$ will appear for nearly every range-gate). If in step 208 no evidence or evidence below a set threshold is found of interference, such as back scattering, in the medium 63 by the digital processing system, then the No branch is taken to step 202 and operation of the three-dimensional imaging system 40 proceeds in CW mode. If in step 208 evidence above a set threshold is found of a back scattering medium 63 by the digital processing system, then the Yes branch is taken to step 206 and operation of the three-dimensional imaging system 40 continues in flash mode.

It is important to note that instead of incrementally varying the location of $V_{gate}$ in time relative to the light source pulse signal which is not varying in time from pulse to pulse, the light source pulse signal can instead be made to incrementally vary in time relative to the location of $V_{gate}$ which can be non-varying in time from pulse to pulse.

Figure 5:
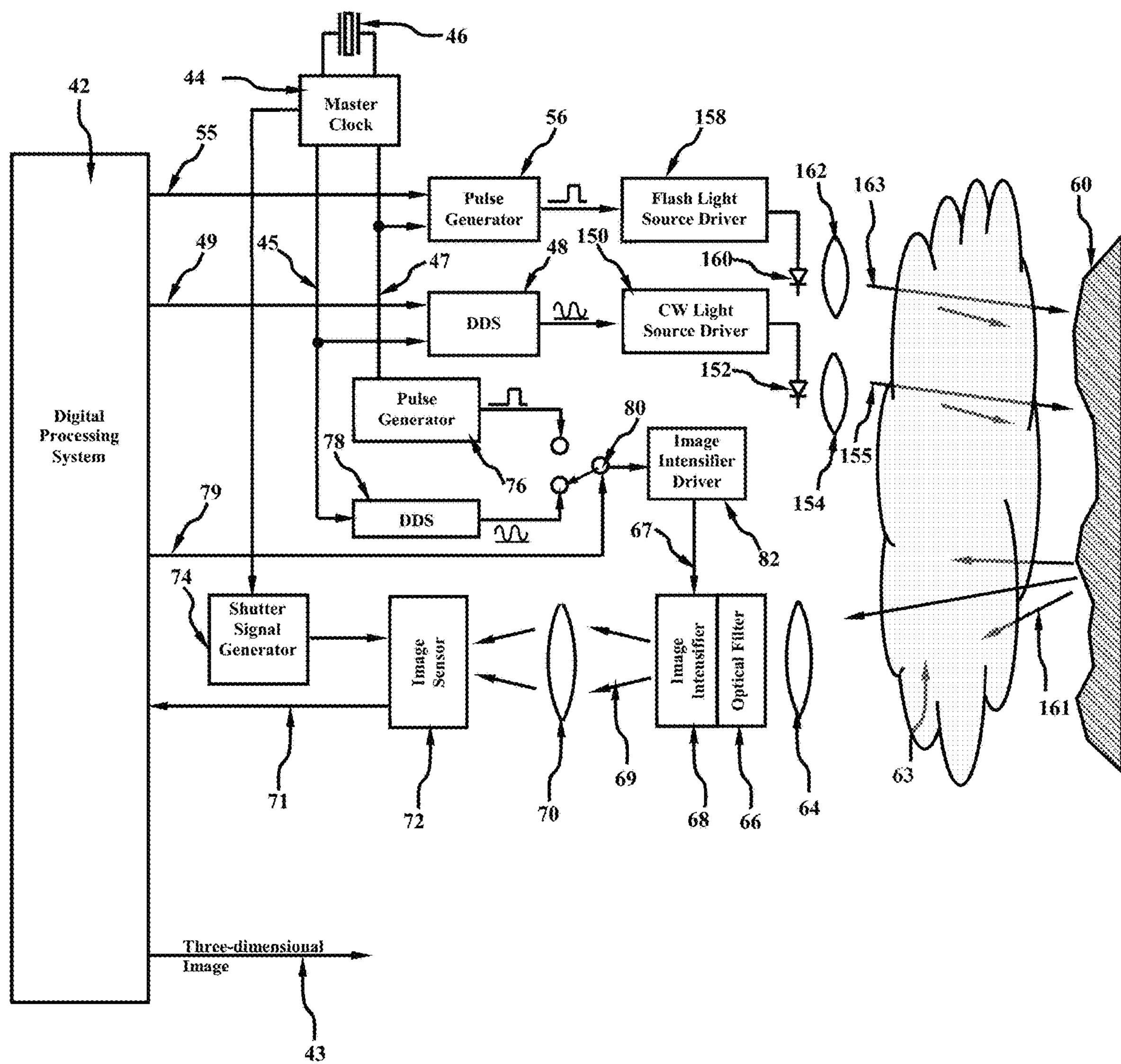
FIG. 5 is a block diagram of another example of a three-dimensional imaging system which can perform three-dimensional imaging through both clear and obscuring media.

Referring to FIG. 5, another example of a three-dimensional imaging system 140 which can perform three-dimensional imaging through both clear and obscuring media is illustrated. The three-dimensional imaging system 140 is the same in structure and operation as the three-dimensional imaging system 40 except as otherwise illustrated and described by way of the examples herein. Elements in three-dimensional imaging system 140 which are like those in the three-dimensional imaging system 40 will have like reference numerals.

In this example, the three-dimensional imaging system 140 does not have a light source signal switch 58, but instead has a fast flash light source 160 coupled to and driven by a flash light source driver 158 which in turn has an input coupled directly to an output of source pulse generator 56. Three-dimensional imaging system 140 also has a slower CW light source 152 coupled to and driven by an output of CW light source driver 150 which in turn has an input directly coupled to an output of source DDS 48.

Flash light source driver 158 is similar to CW light source driver 150 except flash light source driver 158 must have additional bandwidth to accommodate the fast rising and falling transitions at the start and end of the electronic pulse input to it. That is, the bandwidth of flash light source driver 158 must be at least 100 MHz, or preferably at least 1 GHz, and ideally more than 2 GHz in order to amplify and output the high-bandwidth pulses with good fidelity, whereas the bandwidth of CW light source driver 150 needs to be only as great as the frequency of the modulation signal output by source DDS 48, such as 25 MHz for example.

In operation, when three-dimensional imaging system 140 is in flash mode, source pulse generator 56 is activated by the digital processing system 42 through pulse generator control line 55 such that flash light source 160 is emitting pulsed illuminating light 163 (source DDS 48 is inactivated by the digital processing system 42 through DDS control line 49 such that CW light source 152 is not emitting light) and the balance of three-dimensional imaging system 140 executes flash mode processing as described earlier in connection with FIG. 2 and three-dimensional imaging system 40.

Alternately when three-dimensional imaging system 140 is in CW mode, source DDS 48, CW light source driver 150, and CW light source 152 are activated by the digital processing system 42 such that CW light source 152 is emitting sinusoidally modulated CW illuminating light 163 (source pulse generator 56, flash light source driver 158, and flash light source 160 are inactivated by the digital processing system 42), and the balance of three-dimensional imaging system 140 executes CW mode processing as described earlier in connection with FIG. 2 and three-dimensional imaging system 40.

Accordingly, as illustrated and described by way of the examples herein, examples of this technology provide methods and apparatuses for improved three-dimensional imaging capable of detecting a presence or absence of any veiling particulates in between a three-dimensional imaging system and a target and adjusting between a flash-measuring mode and a phase-measuring mode based on this detection. By way of example only, applications for examples of this technology include guidance and navigation systems for autonomous and semi-autonomous vehicles, as well as collision avoidance for vehicular usage. Examples of this technology also can be used for consumer photography, augmented reality and virtual reality, as well as for cinematography. Security applications can include three-dimensional surveillance and facial recognition.

Having thus described the basic concept of the invention, it will be rather apparent to those skilled in the art that the foregoing detailed disclosure is intended to be presented by way of example only and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations, such as arrows in the diagrams therefore, is not intended to limit the claimed processes to any order or direction of travel of signals or other data and/or information except as may be specified in the claims. Accordingly, the invention is limited only by the following claims and equivalents thereto.

What is claimed is:

1. A three-dimensional imaging system comprising:

a light emission system configured to be modulated with a selected one a first waveform or a second waveform to output light directed at a target;

an image capture system configured to be modulated with the selected one of the first waveform or the second waveform to obtain an image from reflected light from the output light; and an image processing computing device coupled to the light emission system and the image capture system and comprising a processor and a memory comprising programmed instructions stored thereon, the processor configured to be capable of executing the stored programmed instructions to:

adjust modulation of the light emission system and the image capture system between the first waveform or the second waveform based on a level of interference in a medium in which output light is directed into for imaging; and generate and provide a three-dimensional image based on the adjusted modulation of the light emission system and the image capture system and the obtained reflected light from the output light.

2. The system as set forth in claim 1 wherein for the adjust the modulation of the light emission system and the image capture system the processor is further configured to be capable of executing the stored programmed instructions to:

adjust the modulation from the first waveform to the second waveform when a three-dimensional image of a target captured through the medium with the modulation with the first waveform is identified with a certainty above a set threshold.

3. The system as set forth in claim 2 wherein for the adjust the modulation of the light emission system and the image capture system the processor is further configured to be capable of executing the stored programmed instructions to:

adjust the modulation from the second waveform to the first waveform when a detected level of interference in the medium with the modulation with the second waveform is below a set threshold.

4. The system as set forth in claim 1 wherein the light emission system further comprises:

a light source driver configured to be selectively modulated with the first waveform generated by a first waveform generator or the second waveform generated by a second waveform generator; and a switch coupled to the digital processing system and coupled between the light source driver and a first position to the first waveform generator or a second position to the second waveform generator.

5. The system as set forth in claim 1 wherein the light emission system further comprises:

a first light source driver coupled to a first light source; and a second light source driver coupled to a second light source;

wherein the first waveform generator which generates the first waveform and the second waveform generator which generates the second waveform is coupled to the image processing computing device;

wherein the processor is further configured to be capable of executing the stored programmed instructions to switch from the first waveform generator to the second waveform generator when the level is above the threshold or from the second waveform generator to the first waveform generator when the level is below the threshold.

6. The system as set forth in claim 5 wherein the first light source is an LED device and the second light source is a diode laser device.

7. The system as set forth in claim 1 wherein the first waveform from a first waveform generator is a continuous modulation waveform and the second waveform from a second waveform is a binary modulation waveform.

8. The system as set forth in claim 7 wherein the image capture system further comprises an image sensor, wherein a frame rate of the image sensor is greater than thirty frames per second when the continuous modulation waveform is selected.

9. The system as set forth in claim 7 wherein the image capture system further comprises an image sensor, wherein a frame rate of the image sensor is greater than two frames per second when the binary modulation waveform is selected.

10. A method for making a three-dimensional imaging system comprising:

providing a light emission system configured to be modulated with a selected one a first waveform or a second waveform to output light directed at a target;

providing an image capture system configured to be modulated with the selected one of the first waveform or the second waveform to obtain an image from reflected light from the output light; and coupling an image processing computing device to the light emission system and the image capture system, the image processing computing device comprising a processor and a memory comprising programmed instructions stored thereon, the processor configured to be capable of executing the stored programmed instructions to:

adjust modulation of the light emission system and the image capture system between the first waveform or the second waveform based on a level of interference in a medium in which output light is directed into for imaging; and generate and provide a three-dimensional image based on the adjusted modulation of the light emission system and the image capture system and the obtained reflected light from the output light.

11. The method as set forth in claim 10 wherein for the adjust the modulation of the light emission system and the image capture system the processor is further configured to be capable of executing the stored programmed instructions to:

adjust the modulation from the first waveform to the second waveform when a three-dimensional image of a target captured through the medium with the modulation with the first waveform is identified with a certainty above a set threshold.

12. The method as set forth in claim 11 wherein for the adjust the modulation of the light emission system and the image capture system the processor is further configured to be capable of executing the stored programmed instructions to:

adjust the modulation from the second waveform to the first waveform when a detected level of interference in the medium with the modulation with the second waveform is below a set threshold.

13. The method as set forth in claim 10 wherein the providing the light emission system further comprises:

providing a light source driver configured to be selectively modulated with the first waveform generated by a first waveform generator or the second waveform generated by a second waveform generator; and coupling a switch to the image processing computing device and between the light source driver and a first position to the first waveform generator or a second position to the second waveform generator.

14. The method as set forth in claim 10 wherein the providing the light emission system further comprises:

providing a first light source driver coupled to a first light source; and providing a second light source driver coupled to a second light source;

wherein the first waveform generator which generates the first waveform and the second waveform generator which generates the second waveform are coupled to the image processing computing device;

wherein the processor is further configured to be capable of executing the stored programmed instructions to switch from the first waveform generator to the second waveform generator when the level is above the threshold or from the second waveform generator to the first waveform generator when the level is below the threshold.

15. The method as set forth in claim 14 wherein the first light source is an LED device and the second light source is a diode laser device.

16. The method as set forth in claim 10 further comprising:

providing a first waveform generator configured to generate the first waveform as a continuous modulation waveform; and providing a second waveform generator is configured to generate the second waveform as a binary modulation waveform.

17. The method as set forth in claim 16 wherein the providing the image capture system further comprises providing an image sensor configured to provide a frame rate greater than thirty frames per second when the continuous modulation waveform is selected.

18. The system as set forth in claim 16 wherein the providing the image capture system further comprises providing an image sensor configured to provide a frame rate greater than two frames per second when the binary modulation waveform is selected.

* * * * *